US008002174B2

(12) United States Patent
Coyne, III et al.

(10) Patent No.: US 8,002,174 B2

(45) Date of Patent: Aug. 23, 2011

(54) MEDICATION ADMINISTRATION TRACKING

(75) Inventors: Martin M. Coyne, III, Wyckoff, NJ (US); Glenn Kopf, Fair Lawn, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 625 days.

(21) Appl. No.: 11/963,193

(22) Filed: Dec. 21, 2007

(65) Prior Publication Data

US 2009/0159714 A1 Jun. 25, 2009

(51) Int. Cl.
*G06F 17/00* (2006.01)

(52) U.S. Cl. ........................................ 235/375; 235/487

(58) Field of Classification Search .................. 235/375, 235/383, 487, 454; 283/62, 66.1, 48
See application file for complete search history.

(56) References Cited

U.S. PATENT DOCUMENTS

| | | | | |
|---|---|---|---|---|
| 2,340,719 | A | 2/1944 | Walter | |
| 2,883,262 | A | 4/1959 | Borin | |
| 3,045,494 | A | 7/1962 | Gerarde | |
| 3,072,120 | A | 1/1963 | Sharp et al. | |
| 3,263,820 | A | 8/1966 | McFadden et al. | |
| 3,266,298 | A | 8/1966 | Whitehead et al. | |
| 3,612,321 | A | 10/1971 | Larson | |
| 3,817,428 | A | 6/1974 | Buckley | |
| 3,905,477 | A | 9/1975 | Graham | |
| 4,122,947 | A | 10/1978 | Falla | |
| 4,277,089 | A | 7/1981 | Lockhart | |
| D261,778 | S | 11/1981 | Wippern | |
| 4,526,404 | A | 7/1985 | Vazquez | |
| 4,581,013 | A | 4/1986 | Allen | |
| D294,223 | S | 2/1988 | Gollon et al. | |
| 4,799,712 | A | 1/1989 | Biava et al. | |
| 4,857,716 | A | 8/1989 | Gombrich et al. | |
| D305,869 | S | 2/1990 | Gollon et al. | |
| 4,921,277 | A | 5/1990 | McDonough | |
| 5,046,609 | A * | 9/1991 | Mangini et al. | 206/232 |
| 5,048,870 | A | 9/1991 | Mangini et al. | |
| D322,815 | S | 12/1991 | Gollon | |
| D345,584 | S | 3/1994 | Gollon | |
| 5,524,634 | A | 6/1996 | Turkel et al. | |
| 5,692,640 | A * | 12/1997 | Caulfield et al. | 221/70 |
| 5,958,536 | A | 9/1999 | Gelsinger et al. | |
| 5,976,014 | A | 11/1999 | Petrick et al. | |
| 5,979,941 | A | 11/1999 | Mosher, Jr. et al. | |
| D418,538 | S | 1/2000 | Fabel | |
| 6,086,108 | A | 7/2000 | Rosenberger | |
| D430,615 | S | 9/2000 | Stevens et al. | |
| D432,176 | S | 10/2000 | Stevens et al. | |
| 6,135,507 | A | 10/2000 | Hamby et al. | |
| 6,155,603 | A * | 12/2000 | Fox | 283/62 |
| 6,447,014 | B1 | 9/2002 | Seidl | |
| D472,573 | S | 4/2003 | Hesse, III et al. | |

(Continued)

OTHER PUBLICATIONS

Extended European Search Report for 08171516.1, dated Jan. 29, 2010, 7 pgs.

*Primary Examiner* — Edwyn Labaze

(74) *Attorney, Agent, or Firm* — Jeanna P. Lukasavage; Diehl Servilla LLC

(57) ABSTRACT

Methods and apparatus for tracking medical administration information, including the anatomical site of administration, are described. Apparatus embodiments include kits including labels having one or more of the time of administration or the anatomical site of administration.

23 Claims, 12 Drawing Sheets

U.S. PATENT DOCUMENTS

| | | | |
|---|---|---|---|
| 6,613,012 B2 | 9/2003 | Kraushaar | |
| 6,637,649 B2 | 10/2003 | Walsh | |
| D484,910 S | 1/2004 | Hansen | |
| D490,114 S | 5/2004 | Dalmau-Salmons | |
| D496,405 S | 9/2004 | Stewart et al. | |
| D500,524 S | 1/2005 | Stewart et al. | |
| 6,910,626 B2 | 6/2005 | Walsh | |
| 6,955,002 B2 | 10/2005 | Sandel et al. | |
| 7,044,664 B2 * | 5/2006 | Papetti | 400/124.01 |
| 7,454,855 B2 * | 11/2008 | Kotik et al. | 40/633 |
| D584,352 S | 1/2009 | Ali et al. | |
| D593,613 S | 6/2009 | Langan et al. | |
| D602,166 S | 10/2009 | Coyne | |
| D602,167 S * | 10/2009 | Coyne et al. | D24/231 |
| 2002/0058928 A1 | 5/2002 | Antonio, II | |
| 2003/0004469 A1 | 1/2003 | Kraushaar | |
| 2004/0088132 A1 | 5/2004 | Schvaneveldt | |
| 2004/0181982 A1 * | 9/2004 | Sandel et al. | 40/324 |
| 2004/0261644 A1 * | 12/2004 | Stewart et al. | 101/483 |
| 2005/0071044 A1 | 3/2005 | Yonge et al. | |
| 2007/0095850 A1 * | 5/2007 | Meyer | 221/2 |
| 2007/0146140 A1 | 6/2007 | Nagao et al. | |
| 2007/0279233 A1 | 12/2007 | Ryckman | |
| 2008/0067802 A1 | 3/2008 | Bell et al. | |
| 2008/0309065 A1 | 12/2008 | Ali et al. | |

* cited by examiner

MEDICATION ADMINISTRATION TRACKING

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

In many cases, concurrent injections are given to patients by a clinician in a single sitting. An example is childhood vaccination. At certain predictable monthly intervals, children and adolescents are given immunizations against various diseases. Especially in the case of infants, multiple concurrent injections may be given in a single physician or clinic visit. In this case, each injection would be given at a different injection site (e.g., left arm, right arm, left leg, right leg).

Filled vaccination medication reservoirs are frequently prepared ahead of patient visits to facilitate safe and expeditious delivery to the patient, who is often apprehensive. In addition, there are medical reporting (charting) requirements with which physicians must comply. These charting requirements address lot traceability (which patients got which vaccine lots, which is important in the case of a recall), administration information (which is important in the case of an allergic reaction to the vaccine), as well as administration verification and parental consent if the patient is a minor.

In the case of childhood or adolescent vaccination, for instance, requirements could include: keeping track of vaccine lot information; injection sites, and the like; recording signature or initials of the administering clinician; and parental consent to each injection. This process is time consuming, and is a diversion from time spent on true clinical practice of medicine. Obviously, the busier a given physician practice is, the more time-consuming, tedious, and error-prone this exercise becomes. It would be desirable to provide a way to link important relevant information on the patient record to the actual medication reservoir in a way that eliminates transcription errors.

In some cases, medication reservoirs pre-filled with vaccine (such as those provided by BD Pharmaceutical Systems Division) have an "extra" preprinted label designed for application to a patient record upon administration. An example of this is Prevnar™ pneumoccal vaccine. However, the accompanying label only includes lot information and does not include administration information such as body side or injection site.

For medication reservoirs filled at point of care, a number of "home grown" solutions to this problem have been developed to address recordkeeping efficiency and consolidation. For instance, forms have been developed that aid recordkeeping. However, these forms do not link the actual vaccine in the medication reservoir to the actual patient record.

Similarly, from a medication reservoir perspective, customers have developed techniques informally to address this. However, they lack the error-proofing and simplicity of the present disclosure.

One solution to this problem employs a colored circular dot to indicate the vaccine (e.g., Measles, mumps, rubella or "MMR" vaccine is green dot; Varicella vaccine is red dot, etc.). This has the disadvantages of not including either administration site or side, and sometimes, the vaccine name. For this information, clinician custom or memory is relied upon.

Another solution uses a "Sharpie™" or other permanent marking pen to put initials for vaccine, site, or side onto the medication reservoir barrel. This has the disadvantage of being easily smudged, being illegible, or having incomplete or conflicting information.

Commonly, filled medication reservoirs are arranged on a tray in specific, repeated order left-to-right, with each medication reservoir being unlabeled. For instance, in the case of vaccines, a particular physician office could arrange MMR, Diptheria or "DPT," and Hepatitis B always in that order. This has the disadvantage of being easily confused if a tray is shaken or dropped, or being confused if a clinician unfamiliar with the ordering system performs the vaccine administration.

Another solution is to print small laser-printed labels with vaccine names (MMR, DPT, etc.). These labels are then removed from the sheet and affixed to the medication reservoir prior to administration.

In each case, existing methods fail to facilitate a key efficiency, which is to link all important relevant information on the patient record to the actual medication reservoir in a way that eliminates transcription errors. In addition, these systems are not standardized and do not "force" a clinician-user to adopt a systematic approach to medication administration and recordkeeping. The present disclosure avoids home-grown solutions that address only half the problem (either medication reservoir labeling or patient charting) and integrates both aspects into a single solution.

One or more embodiments of the present invention address one or more of these needs. In a single operation, with no opportunity for transcription error, embodiments of the invention allow for recording of the actual medicine given during a particular session, as well as providing a mechanism for the labeling of medication reservoirs so doses are not misadministered, forgotten, or double-administered during a physician visit.

SUMMARY OF THE INVENTION

One or more embodiments of the present invention are directed toward kits for tracking medication administration information including the anatomical site of administration to a patient. The kit including a substrate comprising at least one label adapted for adhering to a medication reservoir. The label comprises indicia for recording information including the anatomical site of administration to a patient.

Additional embodiments are to kits for tracking medication administration to a patient, comprising a substrate and a label. The label may be adapted to adhere to a medication reservoir. The label may be located on a substrate. The label comprises a top layer and at least one subsequent layer. The at least one subsequent layer can be the substrate. There is an area for recording the identification of the medication reservoir contents, which is optionally pre-printed, indicia for identifying the anatomical site of injection to the patient, and a substance adapted to transfer information written on the top layer to the at least one subsequent layers. The substrate also comprises pre-printed indicia pertaining to the administration of medication; and optionally at least one blank area for recording customized information; and optionally at least one bounded space for recording specific information; and optionally space for additional labels; space for recording one or more of the lot number of the medication reservoir contents, date, identification of medical personnel and relevant notes.

Further embodiments are for kits for tracking medication administration to a patient, comprising a substrate and a label for adhering to a medication reservoir. The label may be located on the substrate, and comprise at least a top layer and a subsequent layer. An area for recording the identification of the medication reservoir contents which is optionally preprinted, indicia for identifying the location of the injection, and a means for adhering the label to a medication reservoir may also be included. The label might also include a substance for transferring information written on the top layer to subsequent layers. The substrate comprises pre-printed information relating to the administration of medication; and optionally at least one blank area for recording customized information; and optionally at least one bounded space for recording specific information; and optionally space for additional labels, space for recording one or more of the lot number of the medication reservoir contents, date, identification of medical personnel and relevant notes.

One or more embodiments are directed toward methods for monitoring the administration of medication to a patient. Embodiments of the methods use a substrate and a medication reservoir. The method includes the steps of providing a medication reservoir containing a medication for administration to a patient; recording the anatomical site of administration to the patient on a label on a substrate; removing the label from the substrate; affixing the label to the medication reservoir; and administering the contents of the medication reservoir to the patient.

Further embodiments are to medical monitoring kits comprising a plurality of syringes adapted for administering medication to a patient, a plurality of forms adapted for recording patient history and a plurality of labels adapted for adhering to a syringe, the labels comprising indicia for recording the anatomical site of administration of medication to the patient.

Additional embodiments are to methods of transcribing information. The methods include recording information pertaining to a medication on a label adapted for adhering to a surface, removing the top surface of the label and applying the label to a surface. The label comprises a top surface, at least one layer, and indicia for recording the site of administration of the medication to a patient.

Another embodiments are directed to kits for tracking medication delivery information including the time of administration to a patient. The kit includes a label adapted for adhering to a medication reservoir. The label comprising indicia for recording the time of medication delivery on the patient.

DETAILED DESCRIPTION

Figure 1A:
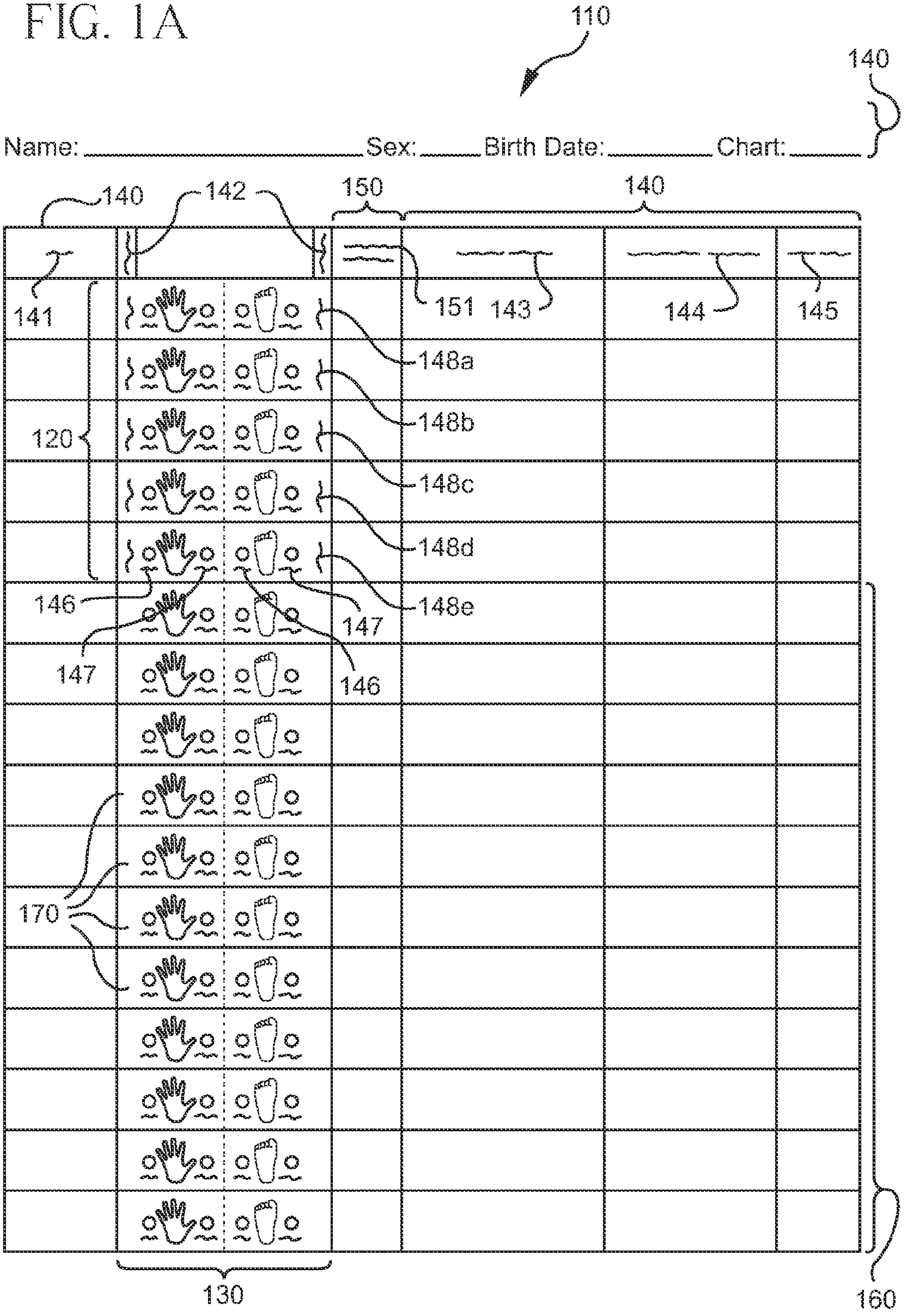
FIGS. 1A and FIG. 1B show exemplary embodiments of substrates containing labels thereon.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a substrate" includes a combination of two or more substrates, and the like.

As used throughout this specification and claims, the term "medication reservoir" has an expanded definition. Any container which can hold a medication fits this definition. Non-limiting examples of these containers include syringes (both empty and pre-filled), cups and vials and ampoules (filled with liquids or solids). Additionally, the "medication reservoir" does not need to be the final form; it can be an intermediate, for example, a vial containing a lyophilized product. The product is reconstituted in the vial and then withdrawn into a syringe for administration. The vial in this example would be an intermediate container.

Furthermore, a "medication reservoir" can also being anything which holds a record of medication. For example, the patient history chart maintained by a physician's office holds a history of the vaccinations and medications given to the patient. This chart is considered a medication reservoir for the purposes of this disclosure and the appended claims.

As used throughout this disclosure and claims, the term "substrate" is anything to which a label is or can be adhered to. Non-limiting examples of substrates include paper, syringes, vials or any type of medication reservoir. Substrate can also refer to the base onto which the clinician writes (i.e., the patient's medical records). A substrate can also include a label according to one or more embodiments. For example, where there is a plurality of labels stacked together, the label beneath the top label would act as a substrate for the top layer.

The term "adhesive," as used in this disclosure and claims, does not need to be permanent. Any type of substance which acts to cause one surface to "stick," or "adhere" to another surface, no matter how temporarily, is an "adhesive" for use in this disclosure.

Embodiments of the present invention provide a visual cue that administration has been completed. Labels that have been removed are instantly visible, thus preventing double-administration of vaccine because prior administrations were forgotten.

One or more embodiments save time and effort, as information is only entered once, and multiple copies are produced without possibility of transcription error. Some embodiments of the invention allow for the consolidation of information into a central, single sheet which is easily incorporated into paper medical recordkeeping systems.

Embodiments of the invention can be easily adapted to other medical areas that include multiple injections, such as, but not limited to, allergy, family practice, radiology, and occupational/employee health. It could also be extended to other areas than injection, such as oral medication administration (for example, using oral medication reservoirs or dosing spoons) as in the case of pediatric antibiotics.

Further embodiments allow for the medication reservoir content to be identified and multiple filled medication reservoirs to be distinguished from one another when multiple injections are given. This can help to avoid wrong-site injections, and possible misdiagnoses in the event of a post-administration allergic reaction.

Embodiments of the present disclosure are directed toward a labeling and recording device for immunizations; however, it should not be construed as limiting application to vaccination; many other applications of the disclosure are evident to those skilled in the medication preparation and delivery arts. Similarly, while the disclosure is presented as providing labeling for medication reservoirs, this is not intended to limit the application of the disclosure; it could be used on a variety of medication administration devices and records.

One or more embodiments of the invention are directed to a kit for tracking medication administration information. The kit provides the ability to track the anatomical site of administration of a medication to a patient. In an embodiment, the kit includes a substrate and at least one label adapted for adhering to a medication reservoir. The label of some embodiments contains indicia for recording information comprising the anatomical site of administration to the patient.

In other embodiments, the label has a space for recording the contents of the medication. In further embodiments, the label is pre-printed with information identifying the medication. In additional embodiments, the label is perforated. This allows for the removal of a part of the label, instead of the whole label. According to one or more embodiments, the label includes a visual representation of the anatomical site of administration. The representation can be, but is not limited to, images of hands, feet, arms, legs, a torso, a portion of a torso, an outline of a human, human-like representations and combinations thereof. In one or more embodiments, labels are provided that enable a user of the label to indicate a zone or area of the patient's body to which the medication has been administered. For example, in some instances a medication may only be delivered to the arm of a patient. In certain embodiments, the label is such that the specific area or zone of the arm can be indicated as the anatomical site of administration.

In one or more embodiments, the label comprises at least one layer; for example, a top layer and at least one subsequent layers. In some embodiments, at least one of the subsequent layers is removable. In additional embodiments, the top layer is a different size than at least one of the subsequent layers. In other embodiments, the top layer contains different information than the at least one subsequent layer. Such an embodiment is useful in situations where the information contained on the set of labels is arranged as a variety of subsets of an entire set of information, and each layer can capture a different subset of information. For example, one layer may contain information pertaining only to the drug administered and the date, and this layer may be placed on a vaccination record provided to the patient. A second layer may include the same information as the information on the first layer and additionally include the anatomical site of injection and lot number of the drug, which may then be associated with the vaccination record retained by the clinician. Of course, the information could be varied according to the particular requirements of the medical record and desired use of the information. In one or more embodiments, there is a substance adapted to transfer the information recorded on the top layer to the at least one subsequent layer. In some embodiments, the substance adapted to transfer the information from the top layer to subsequent layers is carbonless copy paper, also known as NCR paper.

Additional embodiments of the invention include a label having at least one bar code. The bar code can be used to store information about the contents of the medication reservoir. Further embodiments include bar codes that are on the substrate and labels, providing a direct machine-readable link between the substrate and the label for patient verification, helping to prevent administration to the wrong patient. Other embodiments comprise a radio-frequency identification device for storing information about the contents of the medication. Such information includes, but is not limited to, the identification of the mediation, the manufacturer, the manufacturer's lot number, the date of manufacture, the date of expiry, the identification of any excipients, the manufacturer and lot numbers of any excipients.

In at least one embodiment, the substrate is, for example, a piece of paper, a patient record, a medication vial, a syringe, an ampoule, a magnet or a loop and hook adhesive fabric. In some embodiments, the substrate includes pre-printed information, a region of bounded space for recording information, a region for recording one or more of the medication identification, date given, age, site, route of administration, dose, payer information, manufacturer, lot number, expiration date, reaction/prior reaction, signature/initial of the administrator, parent/guardian signature/initials.

Another embodiment of the invention pertains to a kit for tracking medication administration to a patient. The kit comprises a substrate and a label adapted for adhering to a medication reservoir. The label may be located on the substrate. The label comprises a top layer and at least one subsequent layer which is optionally the substrate. The label further comprises an area for recording the identification of the medication reservoir contents which is optionally pre-printed, indicia for identifying the anatomical site of injection to the patient, and a substance adapted to transfer information written on the top layer to the at least one subsequent layers. The substrate comprises pre-printed indicia pertaining to the administration of medication, and optionally, at least one blank area for recording customized information, and optionally at least one bounded space for recording specific information, and optionally space for additional labels, space for recording one or more of the lot number of the medication reservoir contents, date, identification of medical personnel and relevant notes.

Still another embodiment of the invention is directed to a kit for tracking medication administration to a patient. The kit comprises a substrate and a label for adhering to a medication reservoir. The label may be located on the substrate and comprises at least a top layer and a subsequent layer, an area for recording the identification of the medication reservoir contents which is optionally pre-printed, indicia for identifying the location of the injection, the label being adapted for adhering the label to a medication reservoir, and the label including a substance for transferring information written on the top layer to subsequent layers. The substrate comprises pre-printed information regarding the administration of medication, and optionally at least one blank area for recording customized information, and optionally at least one bounded space for recording specific information, and optionally space for additional labels, space for recording one or more of the lot number of the medication reservoir contents, date, identification of medical personnel and relevant notes.

In other embodiments, the subsequent layer of the label is the substrate. In further embodiments, the label is perforated. In still further embodiments, the indicia comprises a visual representation of the anatomical site of delivery. In additional embodiments, the visual representation is selected from the group consisting of hands, feet, arms, legs, torso, a portion of a torso, an outline of a human, human-like representations and combinations thereof.

Further embodiments of the invention are directed towards methods for monitoring the administration of medications to a patient. Some embodiments include providing a medication reservoir containing a medication for administration to a patient. The anatomical site of administration to the patient is recorded on the label, which is located on a substrate. The label is removed from the substrate and affixed to the medication reservoir. The contents of the medication reservoir are administered to a patient at the anatomical site specified on the label.

In some embodiments, providing a medication reservoir includes filling the reservoir. In other embodiments, the medication reservoir is pre-filled. In one or more embodiments, the medication reservoir is filled with medication before the label is placed on the medication reservoir. In other embodiments, the medication reservoir is filled with medication after the label is placed on the medication reservoir.

In still further embodiments, removing the label leaves a duplication of the contents of the label on the substrate. In additional embodiments, the substrate, which comprises a duplication of the label contents, is itself a label. In some embodiments, the label is perforated.

In certain embodiments, a method is provided that includes the step of recording pertinent information about the medication. In one or more embodiments, the pertinent information comprises one or more of the medication identification, date given, age, geographical or anatomical site, route of administration, dose, payer information, manufacturer, lot number, expiration date, reaction/prior reaction, signature/initial of the administrator, parent/guardian signature/initials. In additional embodiments, the recorded information includes the identification of the medication on the label. In further embodiments, administering the medication comprises injection the medication into the patient.

Additional embodiments of the invention are directed toward a medical monitoring kit. The kit contains a plurality of syringes adapted for administering medication to a patient, a plurality of forms adapted for recording patient history, and a plurality of labels adapted for adhering to a syringe, the labels comprising indicia for recording the anatomical site of administration of medication to the patient.

Further embodiments are directed at a method of transcribing information. The method includes the steps of recording information pertaining to a medication on a label adapted for adhering to a surface. The label has a top surface, at least one subsequent layer, and indicia for recording the site of administration of medication to a patient. The top surface of the label is removed and applied to a first surface.

In other embodiments, the method includes using a label which is adapted for transferring recorded information to the at least one subsequent layer. In one or more embodiments, the at least one subsequent layer is adapted for adhering to a surface. In still more embodiments, the at least one subsequent layer is removed and applied to a second surface.

Still further embodiments are directed toward a kit for tracking medication delivery information including the time and/or date of administration to a patient. The kit of some of these embodiments includes a label adapted for adhering to a medication reservoir. The label includes indicia for recording the time and/or date of medication delivery to the patient.

Figure 1B:
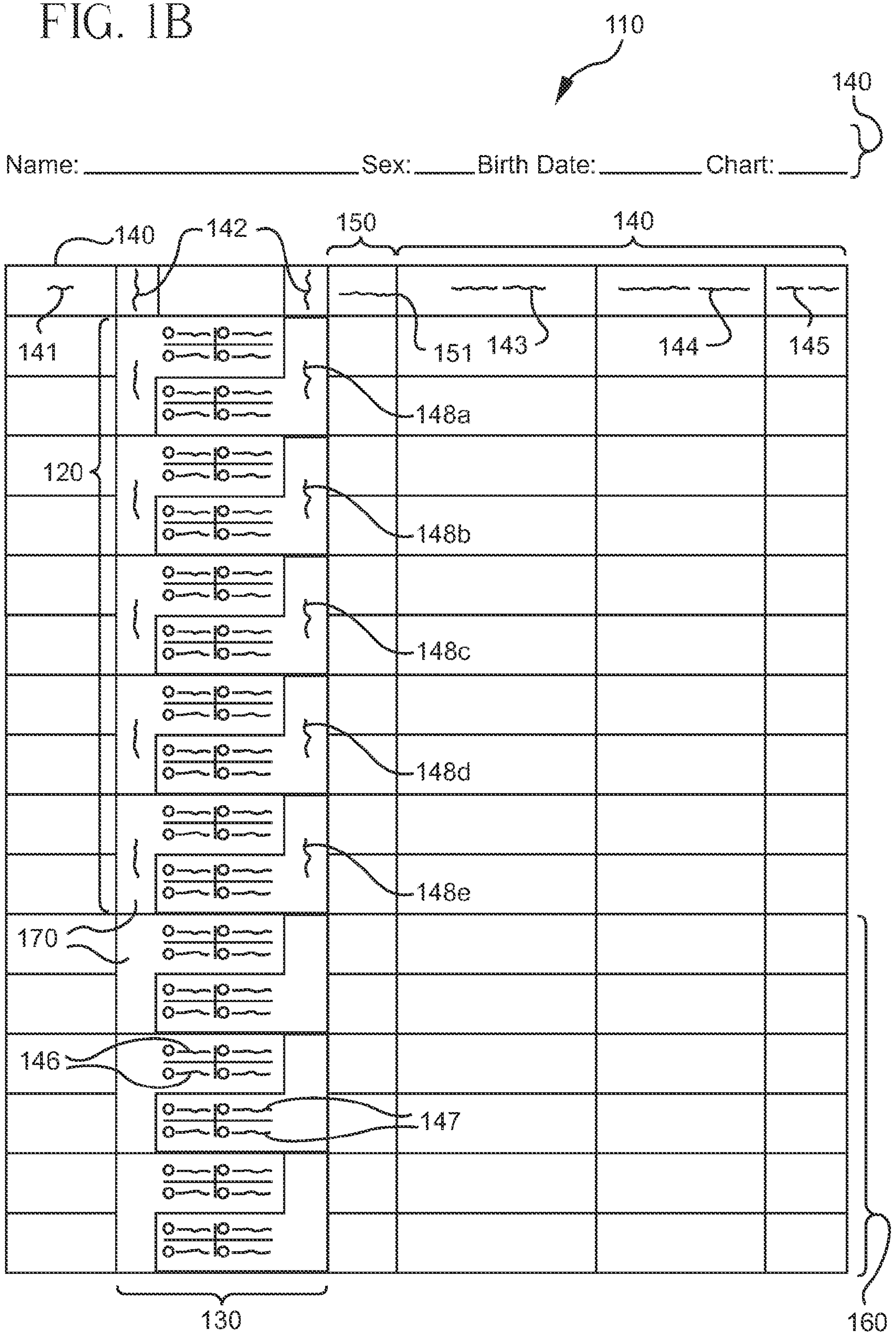

FIGS. 1A and 1B show examples of one or more embodiments of the invention. The displayed embodiment shows a substrate 110, which optionally becomes part of the patient record by, for example, being placed directly into the patient chart. In some embodiments, the substrate could be cardboard, paper, plastic or glass, but is not limited to these.

The substrate according to some embodiments of the invention comprises static information 120, such as a medication or vaccination name (e.g., "MMR 1" or "DTaP"). Other embodiments include a label area 130. The label area may contain one or more labels 170 which comprise indicia for recording information, for example, the anatomical site of administration of a medication. The indicia depicted in FIG. 1A are a simple pattern of circles with location indicators for left and right arms and legs (e.g., LA=left arm, RL=right leg, etc.). The medication administrator can fill in the circle next to the location indicator to record the site of administration. As shown in FIG. 1A, embodiments of the invention use various indicia such as symbols depicting body parts such as hands, arm, and torsos to denote the anatomical administration site. In FIG. 1B, the symbols are omitted and replaced with words describing the site of administration.

In one or more embodiments, the substrate may comprise an area of static structure 140. Non-limiting examples of static structure which may be employed and shown in the Figure include lines, boxes, check boxes, static text containing options selected by the clinician via tick mark or circle, or the like. As another non-limiting example not shown in the drawings, static text could include preprinted Yes or No questions that could be answered by the clinician by marking a checkbox, circle or circling or underlining the selected answer. Such static structure may be utilized to enter variable information (e.g., vaccine lot number, parent or clinician signature) on the substrate. This information provides a framework for required information to become part of the patient's medical record.

In one or more embodiments of the invention, the substrate may further include an area of bounded white space 150, which may consists of lines, boxes, or the like for optional information (e.g., clinician comments). This information may optionally be completed each time the system employing the substrate is used.

In additional embodiments of the invention, the substrate may further include areas of blank space 160, which could be used for additional information not contemplated in a pre-printed form (e.g., for vaccines not available when the forms were printed, but subsequently added). The blank space in some embodiments comprises pre-printed static structure 140 and/or bounded space 150. This area could also accommodate preprinted labels, such as those that come with some pre-filled vaccination medication reservoirs (such as Prevnar®).

It will be understood that the information printed on the substrate and/or label can be printed using conventional printing techniques, or any technique suitable for the intended purpose. In one or more embodiments of the invention, the pre-printed information and layout can be modified from that shown in FIG. 1 in various combinations to facilitate many different clinical applications. Many variations are possible, including various divided, solid, and dashed lines, boxes, tints of color or other shading, and the like.

In some embodiments, the label area 130 contains individual labels 170. The substrate 110 has a matching graphical design and printing registration, such that the labels 170 are placed directly over the printed area. In one or more embodiments, the label 170 is completed by the clinician and removed from the substrate 110. The information recorded on the label 170 is transferred to the label area 130 of substrate 110. Removing the label 170, exposes the transferred recorded information on the underlying label area 130 of the substrate 110.

The labels 170 according to various embodiments are removable by means of a backing, perforation, removable adhesive, or the like. In the case that a backing is provided, it may be attached directly to the substrate 110, or may be removed with the label 170 itself, in which case an additional removal step is required before the label 170 is placed onto the medication reservoir.

According to certain embodiments, the labels 170 are placed directly over the matching printed substrate area 130, and are provided with a feature to allow repetitive information (e.g., injection site/side, and other similar clinically relevant information) that differs between injections to be marked onto the label and be transferred to the printed copy on the substrate below without additional steps. In one or more embodiments, the labels 170 have the same content as the static information 120 area. For example, the static legend "MMR" may have matching indicia "MMR" on the corresponding label.

Figure 2:
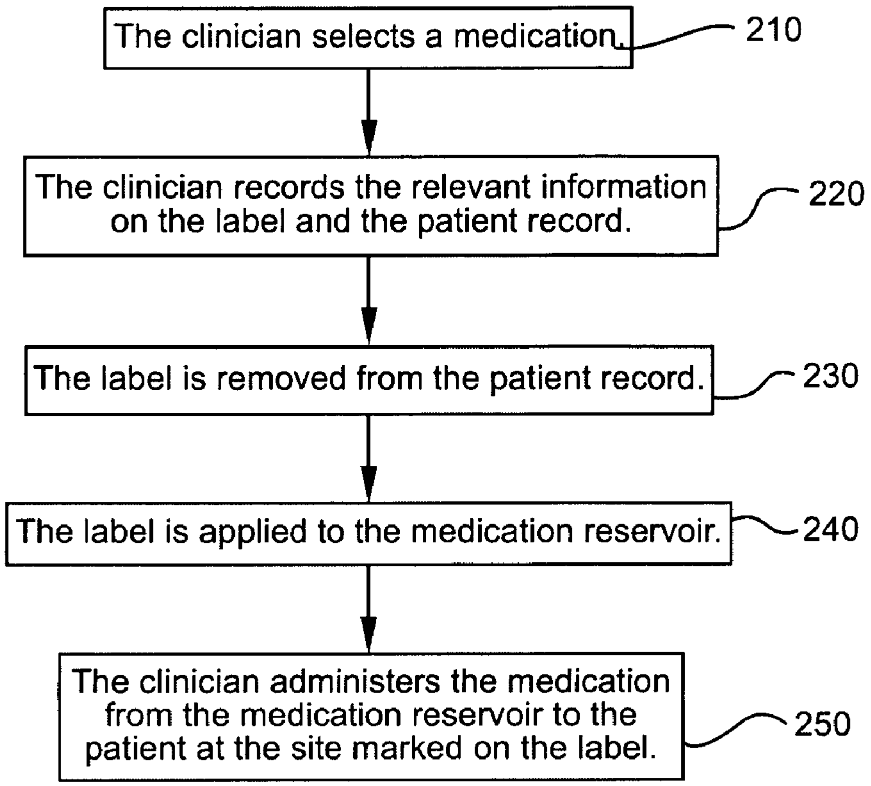
FIG. 2 is a flowchart showing use of a medication tracking system according to one embodiment.

Embodiments of the invention can be used in various scenarios. Several, non-limiting, examples are outline in FIGS. 2-4. FIG. 2 shows an example outline for using one or more embodiments of the invention where the label is originally affixed to the patient record. A clinician selects a medication (e.g., MMR-1) 210, fills in the relevant information corresponding to the patient side (e.g., "Left"), and patient site (e.g., "Arm") 220. During this process, the clinician fills in the dot, checkbox, or other indicia corresponding to the information; the label, designed to mate with the substrate, makes a permanent mark on the substrate containing identical indicia in a directly superimposed position under the label. The completed label is removed 230 and then applied to the medication reservoir 240 containing the vaccine or other medication; the medication reservoir, once filled and labeled, is ready for administration to the patient 250.

Figure 3:
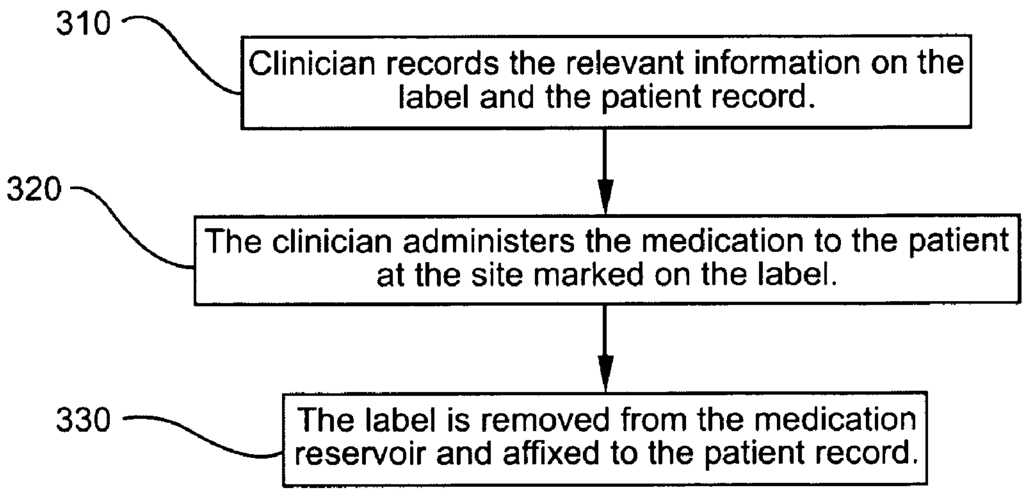
FIG. 3 is a flowchart showing use of a medication tracking system according to one embodiment.

FIG. 3 is a flowchart showing an example outline for a scenario in which the label is originally located on a medication reservoir, and not on the patient record. In the embodiment shown, the clinician selects the medication and records the relevant information on the label 310. The clinician administers the medication to the patient at the site marked on the label 320. The clinician removes the label from the medication reservoir and affixes it to the patient record 330.

It may be desirable to create additional copies of some or all of the information written on the label. Alternate embodiments interpose multiple (e.g., 1, 2, 3 . . . n) layers of material also featuring the transfer capability described herein onto additional removable labels. This would allow the medication reservoir label to be removed for the administration medication reservoir. This embodiment would operate similar to the embodiment described above, but also provide multiple copies (again without possible transcription errors). These copies could be removed either at the time of administration and placed on to additional charts or records (as in the case of state-required vaccination cards), or could be removed at a later time (as in the case of a child's camp registration form to provide proof of vaccination).

Figure 4:
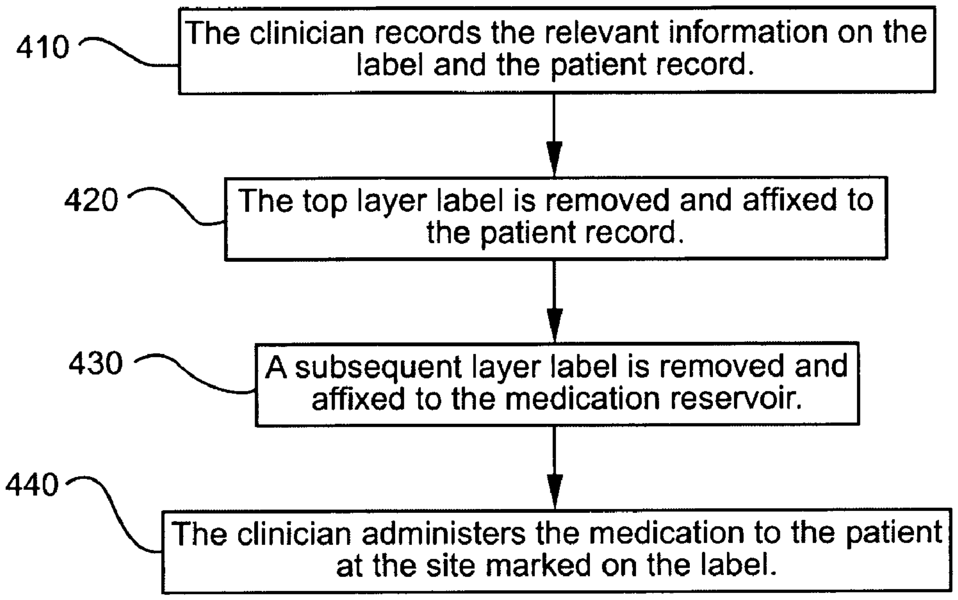
FIG. 4 is a flowchart showing use of a medication tracking system according to one embodiment.

FIG. 4 illustrates a scenario in which the label is not affixed to either the medical record of a patient or a medical reservoir. For example, the label may be supplied as a roll of labels similar to a roll of stamps. Various embodiments of the invention have a label comprising one or more layers. Some of the multiple layer label embodiments have a substance which is used to transfer writing from the top layer to subsequent layers. For example, carbonless copy paper could be employed between layers to create a duplicate of the writing from the top layer. Other suitable substances or means could be use to transfer the writing from the top layer to other layers. In the example shown in FIG. 4, in step 410 the clinician records the relevant information on the label. The act of writing this information on the label creates at least one duplicate copy on a subsequent layer. In step 420, the top layer of the label is removed and affixed to the patient record. A subsequent layer label is removed from the substrate and affixed to the medication reservoir in step 430. The clinician can then administer the medication to the patient at the site marked on the label 440. It is important to note that the order of label placement is not critical. The first label could go on the medication reservoir and a subsequent layer could be placed on the patient record. Additionally, the label does not need to be placed in the record prior to the administration of the medication to the patient. This step can be completed after administration.

In some embodiments, a stack of labels is provided with a substance for transferring writing from the top layer to subsequent layers. Various embodiments employ the label stack by placing the stack of labels into the patient chart. Writing on the top label creates a copy of the information on the subsequent layers. Then one layer can be removed for placement on a medication container, another could be used for records required by schools and athletic associations. These embodiments allow a clinician to record the information associated with the medication one time and have access to copies of the record for repeated use. Embodiments of this variety can have any number of labels stacked together. Further embodiments employ the same stack of labels, but the clinician records information on the label prior to placing the stack of labels into the patient record. The order of recordation, use of and placement of the stack is not important, and can be reordered as desired.

Transfer of the information from the medication reservoir sticker to the patient record substrate could be accomplished many ways. A non-limiting example of one way to do this is to use pressure from a writing instrument to provide copies using a transfer dye, ink or other substance that transfers the information recorded from a first substrate to substrates located beneath the first substrate. Examples of such transfer dyes, inks or substances include, but are not limited to carbon paper, carbonless copy paper (often referred to as NCR paper), crystal violet lactone, PTSMH (p-toluene sulfinate of Michler's hydrol), TMA (trimellitic anhydride), phenol-formaldehyde resins, azo dyes, DIPN (diisopropyl naphtalenes), formaldehyde isocyanates, hydrocarbon-based solvents, polycyclic aromatic hydrocarbons, polyoxypropylene diamine, epoxy resins, aliphatic isocyanates, Bisphenol A, diethylene triamine, and others.

However, this transfer could be provided with CCP in other ways, including a divot such as frequently used on soft drink cup covers (diet/regular/other) or by using a blunt stylus rather than a pen. Each of these methods provides similar pressure, and many alternatives could be utilized.

A common problem in using carbonless forms is that inadvertent application of pressure to the top "original" layer creates stray marks on the layers below. In the setting which this disclosure is commonly used, many files are stacked atop each other, creating ample opportunities to have stray marks created. To avoid this, the CCP mating layers might be selectively applied rather than being coated across the whole page. Thus, only marks in the intended areas are transferred to the layers below. Other transfer techniques could also incorporate this idea of selective coating to avoid similar problems.

Figure 5:
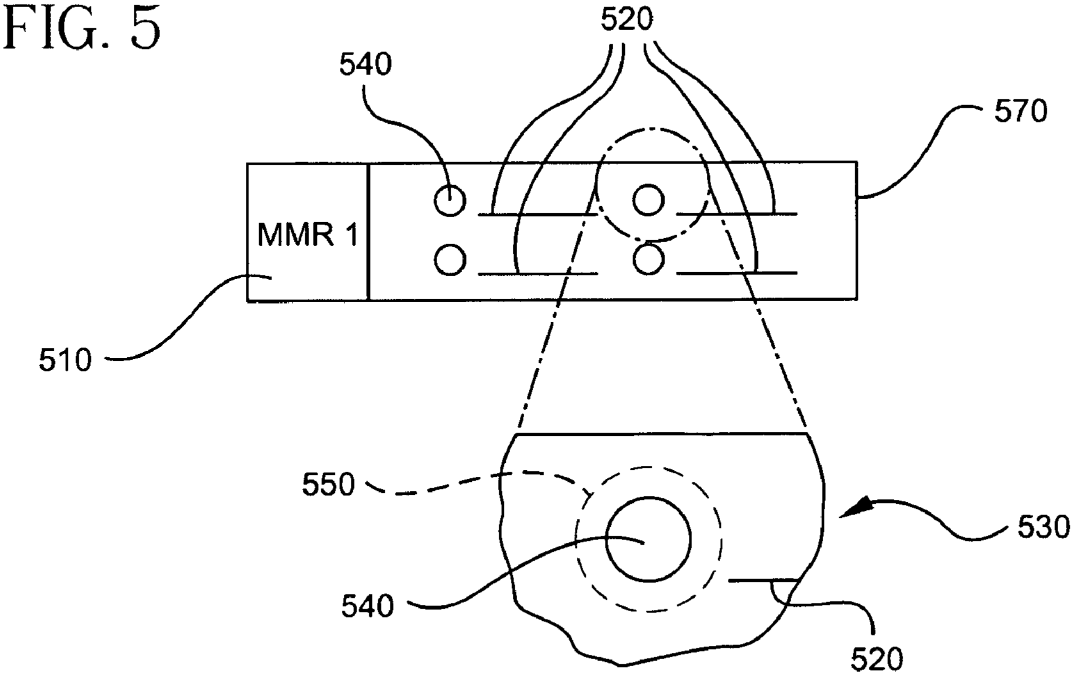
FIG. 5 shows a label directly superimposed on a substrate according to an embodiment of the present invention.

FIG. 5 shows a label 570 directly superimposed on a substrate (located beneath the label 570 and thus not shown) according to one or more embodiments of the present invention. The label shown has the name of the medication 510, indicia for recording the administration site 520, and an open circle for marking the site 540. FIG. 5 shows the indicia for recording the administration site 520 as blank lines. In various embodiments these indicia are pre-printed letters or pictures like a hand, arm or torso. An expanded view of the indicia 530 in FIG. 5 shows details of the open circle 540 and a line 520 representing the administration site mark. The dotted circle 550 is an area in which the CCP mating layer was applied, thereby allowing for transference of a mark made within the CCP circle 550 to the subsequent layer or substrate. The dotted circle 550 can be made on the substrate or the interposing layers as well as on the back of the label 570 as shown. This would depend on the CCP chemistry used. Marks made outside of the CCP circle 550 will not be transferred to subsequent layers.

An alternate, and potentially more cost effective, approach than CCP is to die-cut a perforation around the circumference of each circular shaped "dot" corresponding to left/right or arm/leg. Then by pressing the dot on the label, it is freed from the label and pressed onto the substrate. If the dot were to be filled with a solid color, this would leave a solid color dot on the patient record, and the resulting hole in the label would indicate the clinician selection. This eliminates any concern of stray marks, but potentially requires more advanced printing, diecutting, and perforation techniques.

Figure 6A:
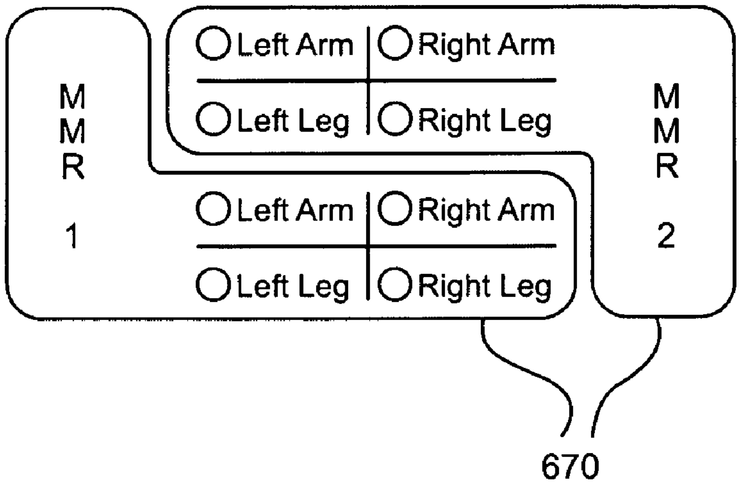
FIGS. 6A and 6B show labels in a nested configuration according to embodiments of the invention.
Figure 6B:
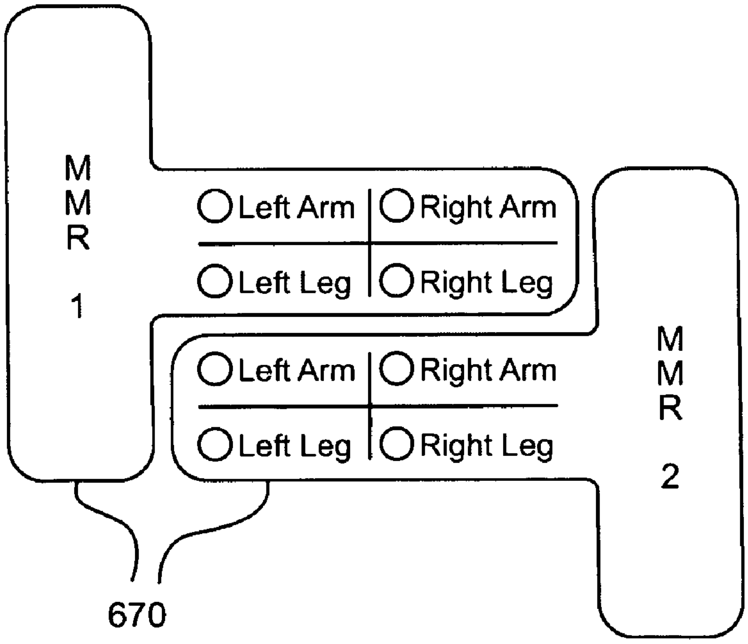

As will be appreciated, a large number of variations can be employed in accordance with embodiments of the present invention. It may be desirable to minimize the size of the labels and/or substrates. FIG. 6A and 6B show exemplary embodiments of labels 670 arranged in a "nested" format that allows for a large, easily readable font size with a minimum of space. As in the previously described embodiments, the labels may contain indicia related to the anatomical site of administration and/or the type of medication to be administered. The labels are shown as being generally "T" or "L" shaped and arranged in an interlocking or nested configuration.

Figure 7A:
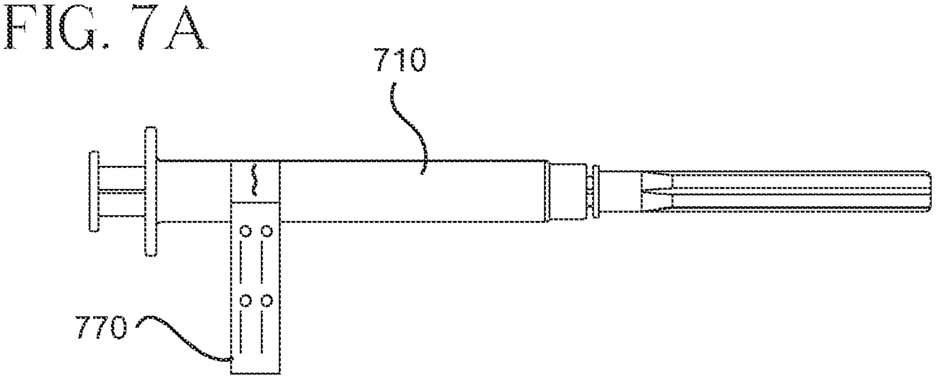
FIG. 7A shows a perspective view of a label attached to a medication reservoir in accordance with an embodiment of the invention.
Figure 7B:
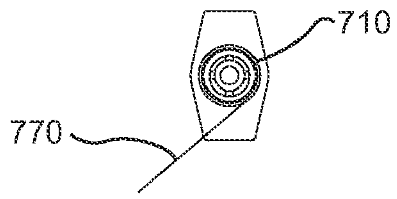
FIG. 7B is a top plan view of the label and medication reservoir shown in FIG. 7A.

According to embodiments of the invention, the label may be applied or mounted to the medication reservoir or other administration device in a variety of different ways. FIGS. 7 and 8 show two exemplary mounting orientations. FIG. 7A shows a perpendicular orientation of the label 770 on a medication reservoir 710. A top plan view, shown in FIG. 7B, reveals that the label 770 extends from the surface of the medication reservoir 710 like a flag.

Figure 8A:
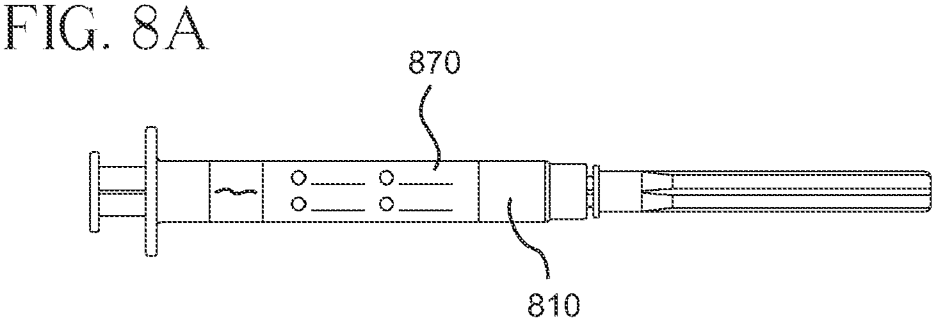
FIG. 8A shows a perspective view of a label attached to a medication reservoir in accordance with another embodiment of the invention.
Figure 8B:
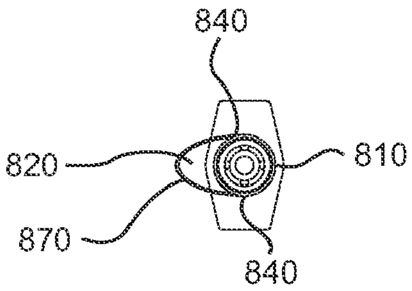
FIG. 8B is a top plan view of the label and medication reservoir shown in FIG. 8A.

FIG. 8A shows an axial orientation with the label 870 applied lengthwise on the medication reservoir. The top plan view of FIG. 8B shows the label 870 being attached to the medication reservoir 810 at two points 840, leaving a gap 820. This type of application might depend on medication reservoir design, nominal volume, filled medication reservoir volume, clinician preference, or other relevant factors. Different shaped medication reservoirs may necessitate differing label orientations. It should be noted that these are not the only orientations available, nor should this be taken as limiting the invention to these orientations. For example, the label 870 of FIG. 8 could be mounted axially with the entire label surface attached to the medication reservoir, thereby eliminating the gap 820.

In one or more embodiments, adhesive may be supplied to the label with various degrees of "tack" or permanency. Similarly, adhesive may be supplied to the label in a selective manner to allow labels to be attached in a variety of methods, for example, the attachment orientation of FIG. 8.

In addition, because the process of administering vaccinations is prone to errors with respect to administration site and side, and because most vaccinations are clear (and thus indistinguishable from each other), design techniques could be included to facilitate review of this information. In some embodiments, color coded labels (e.g., by vaccination series type) are employed. In other embodiments, the label is shaped (as through die-cutting, etc.) or having line art substantially in the human form or likeness, or a portion thereof (e.g., showing only the hand or foot), with appropriate checkboxes or circles to indicate desired site/site placed thusly.

Figure 9A:
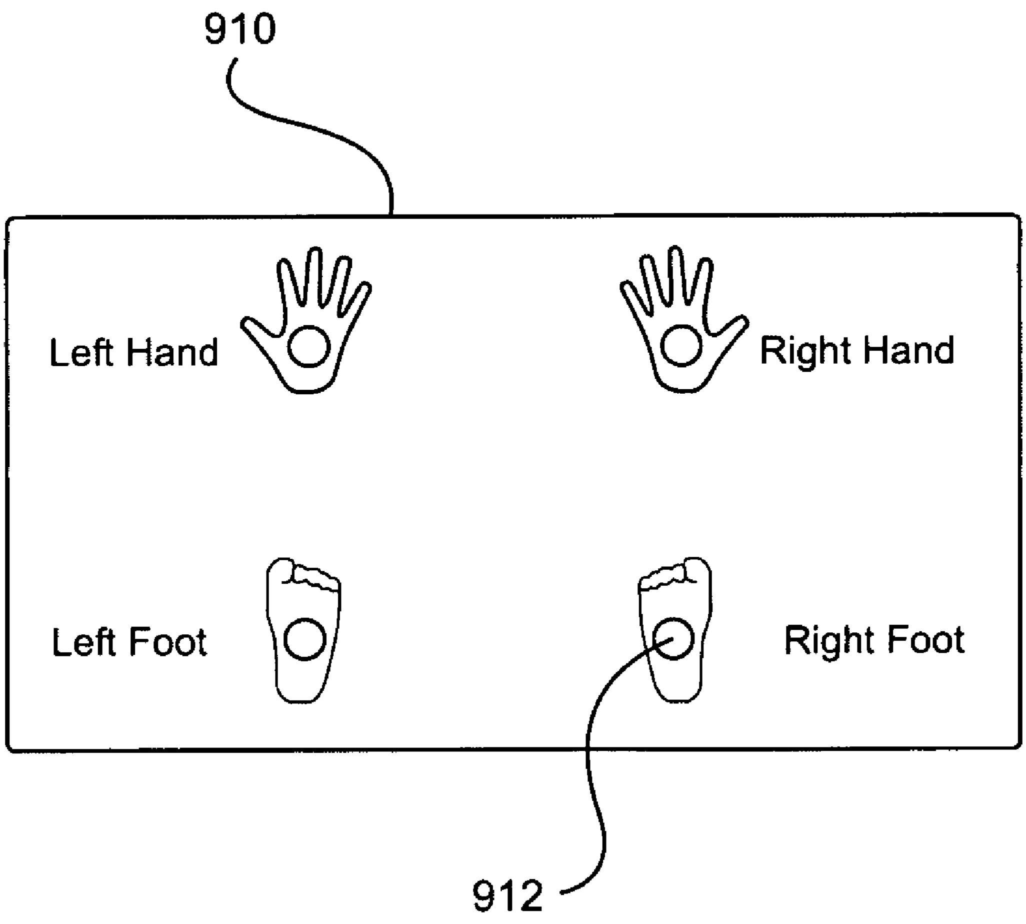
FIGS. 9A-9C show various designs of labels according to embodiments of the invention.
Figure 9B:
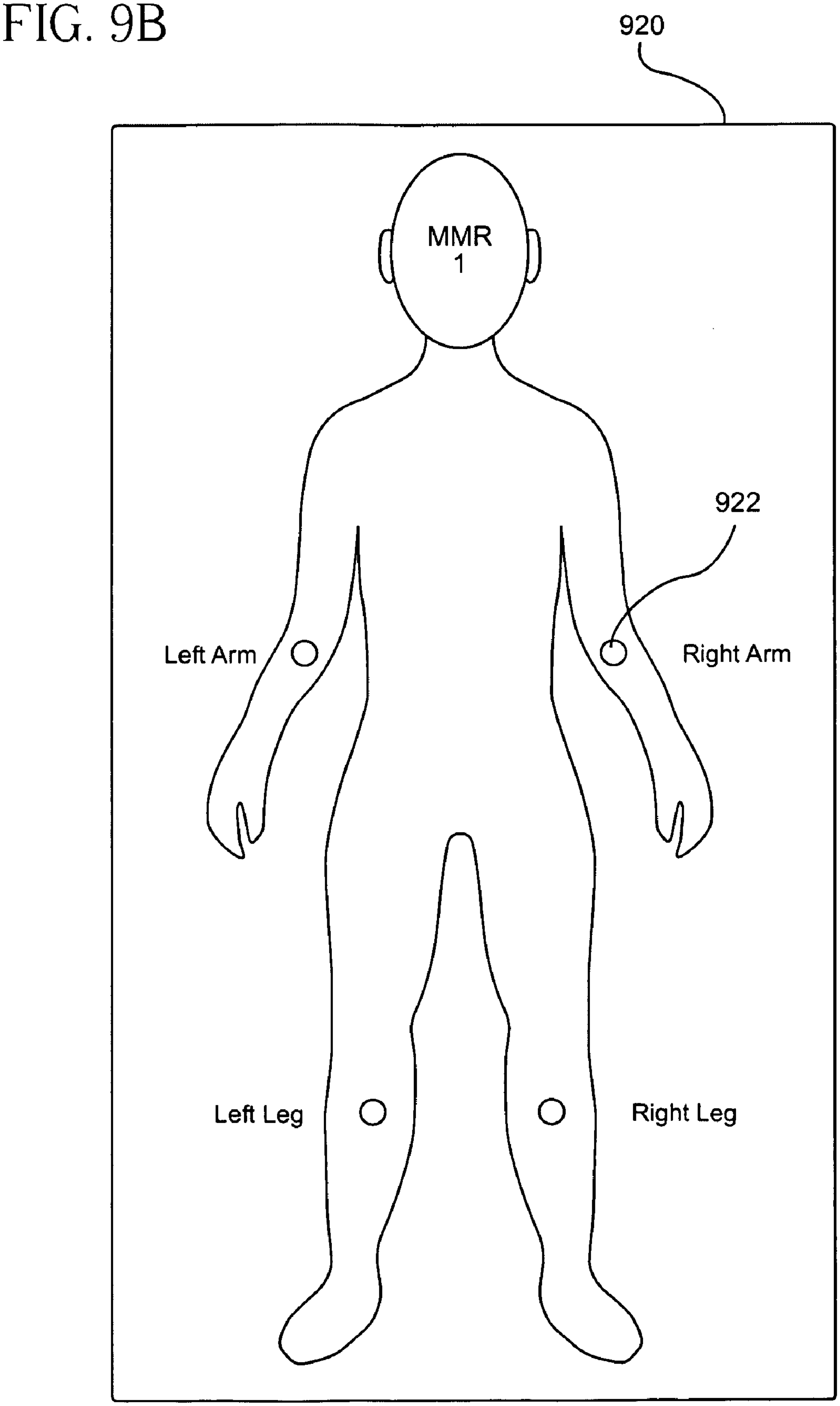
Figure 9C:
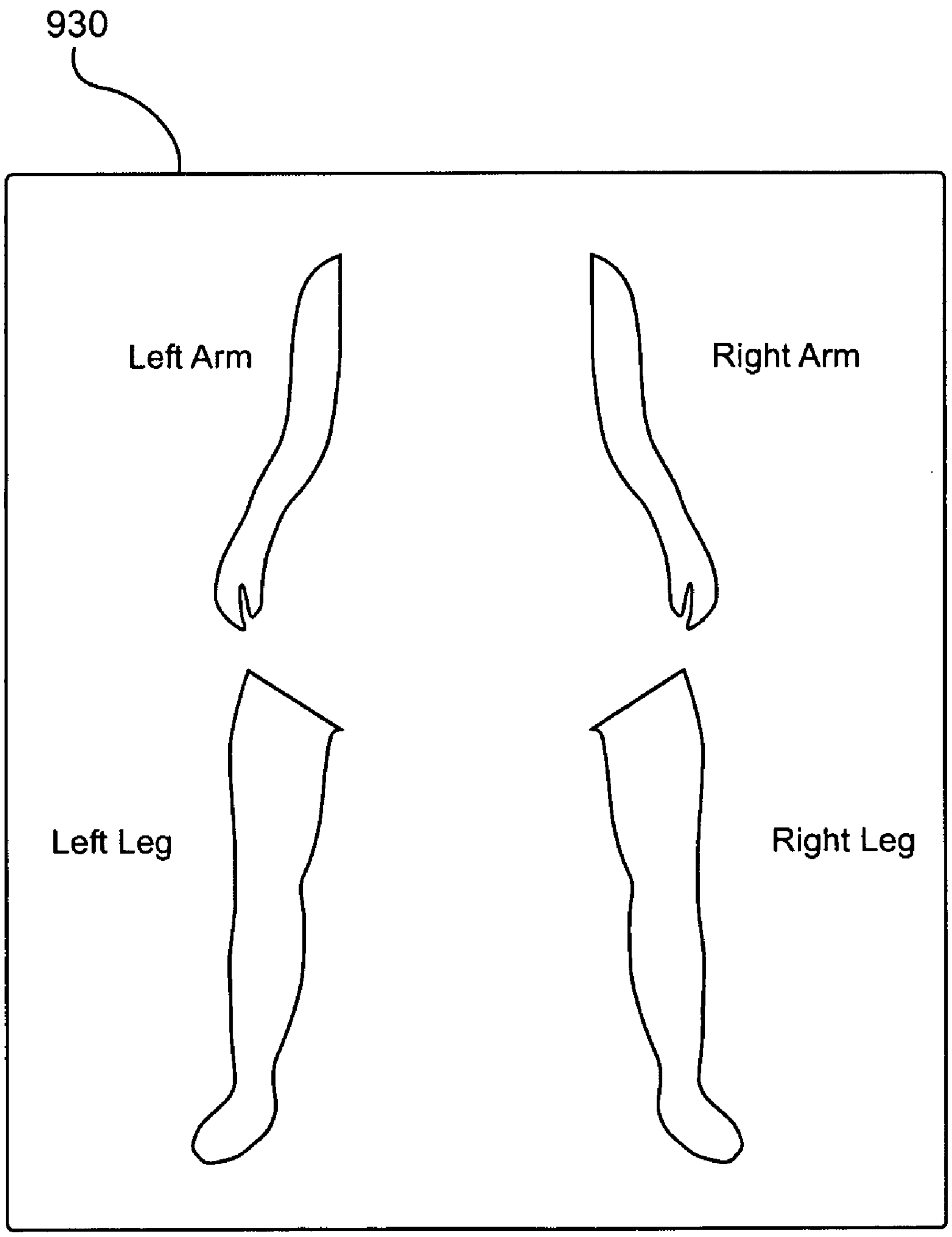

FIGS. 9A-9C show several possible, non-limiting, examples of indicia which may be employed according to different embodiments of the invention. FIG. 9A shows first set of labels 910 in the shape of right and left a hands and feet with an open circle within each label. FIG. 9B shows a label 920 in the shape of a human with an open circle 922 within the label 920. The open circles 912 and 922 could be configured as described above and used to mark the labels and any substrate below the labels. As shown in FIG. 9C, labels 930 are in the shape of stick figure type representation of human limbs, namely left and right legs and arms. It will be appreciated that since medication reservoirs are frequently prefilled prior to administration, there are situations in which a medication reservoir could be filled and inadvertently not administered. Therefore, means could be provided on the label and or substrate to indicate expiration of the medicine after it has been in the container for a predetermined period of time and to avoid administration to another patient. An example of such a means is to provide an indicator such as a dye that changes color, for example, from white to red, after a predetermined period of time following removal. This change in color can be caused by the toner/dye/color pigment contained in the label or substrate. The label could also display words such as "EXPIRED" after the expiration of the predetermined time period to alert the practitioner that the time has expired to administer the contents of the medication reservoir. The label may include a color change, or have words or symbols appear, to denote that a temperature excursion has occurred for the medication, which is particularly useful for medications that are temperature sensitive and may be adversely affected by changes in temperature. Examples of chemical agents that can be used to cause a portion of the label or substrate to change color include reactive agents such as an acid, base, peroxide, amine, or other active chemical moiety is incorporated into the label or substrate so it causes the dye to change color, bleach color, or breaks bonds within the a plastic in the label to release the dye.

Some embodiments use carbonless copy paper (CCP) to transfer information from the label to another label or to a base substrate. CCP consists of sheets of paper that are coated on the bottom and/or the top with micro-encapsulated dye or ink and/or reactive clay. In a sample containing three layers, the back of the first sheet is coated with micro-encapsulated dye. The top of the middle sheet is coated with clay that quickly reacts with the dye to form a permanent mark. The back of the middle sheet is also coated with the dye. The lowermost sheet is coated on the top surface with the clay with no coating applied to the back side. When pressure is applied to the sheets with a writing instrument, the pressure from the point of the writing instrument causes the micro-capsules to break and spill their dye. The dye reacts with the clay layer creating a copy of the written image. Since the capsules are so small, the print obtained is very accurate. Carbonless copy paper was also available in a self-contained version that had both the ink & the clay on the same side of the paper.

It will be appreciated that the labels, system, kits and methods disclosed herein can be used in a wide variety of settings in addition to injectable medications that are delivered concurrently. For example, in one or more embodiments, the system described herein could be used to track administration of antibiotics, administered over a course of doses on multiple days, perhaps by multiple administrators (e.g., parent for morning antibiotic dose, daycare provider for afternoon dose). The device labeled need not be a medication reservoir, but could be any other device that requires administration or any other device used for maintaining medical records. Similarly, the labels, methods and kits described herein could be used to ease identification in related healthcare settings such as pediatrics, family practice, flu clinics, allergy, and occupational/employee health.

Figure 10:
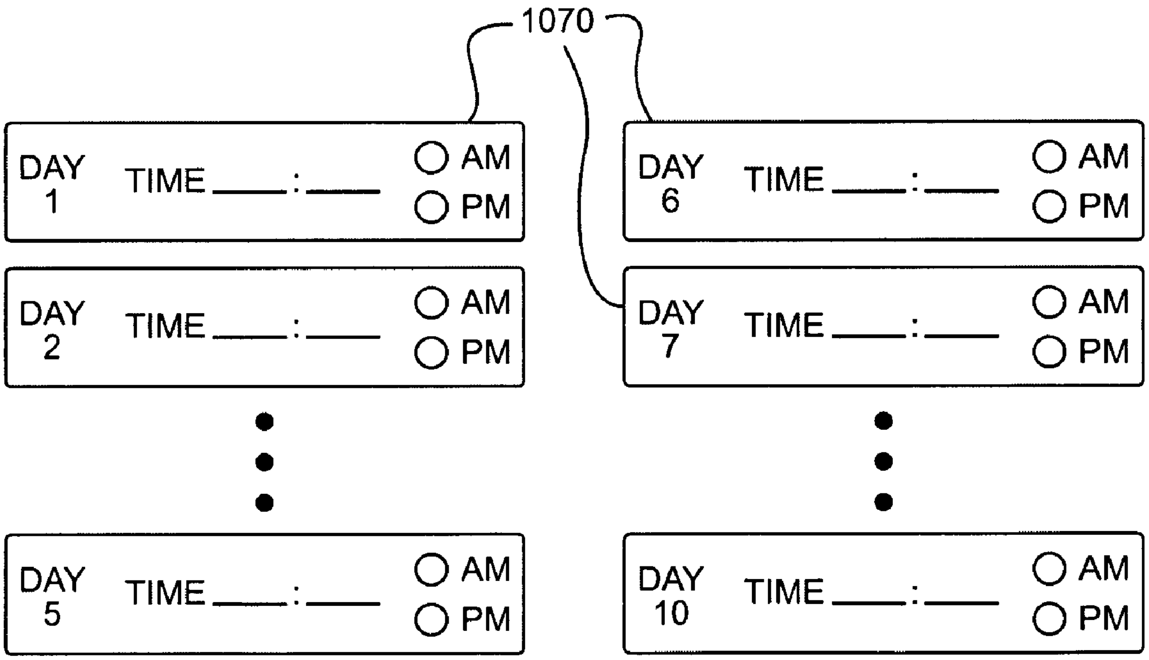
FIG. 10 shows exemplary labels according to an embodiment of the invention.

An exemplary embodiment of an application unrelated to vaccination or injection is shown in FIG. 10. As shown in FIG. 10, a plurality of labels 1070 are shown, each label depicting a time of administration. More particularly, the labels indicate the day of administration (e.g., Day 1, Day 2 . . . Day 10, etc) and a time of administration. The set of labels shown in FIG. 10 could be used in a situation in which a prescription is filled and multiple dosages are to either be administered by a nurse outside of a health care facility (for example, in a school), a caretaker, or the patient could self-administer the medication. A set of labels could be provided with the medication, which could be adhered to the medication reservoir or other place visible to the individual administering the medicine so that the administration of the medication could be tracked. In the example shown in FIG. 10, the circles 1072 on the labels could be marked to keep track of the administration of the AM and PM dosages of the medication. As the second dose is administered, each day, the next label could be applied to the next medication to the reservoir or over the previously completed label. It will be appreciated that variants could include tracking dosage number for medications that require a fixed number of doses. This embodiment shows the variety of substrates that could be used; a preferential substrate in this case could be a refrigerator magnet onto which the labels are applied.

As will be appreciated from the above, embodiments of the present invention pertain to a method for providing a medicine administration record with information associated with the medicine administration. The embodiment described above works well for practitioners or facilities with new practices or with new patients requiring vaccinations. As patients are added, each receives a new vaccination record, complete with all the features outlined in the previous disclosure. Obviously, new practices that start with a full form would have consistency across all of their patients. For existing practices with existing patient records, adoption is less clear.

Embodiments of the invention can also be used in settings in which practitioners using an "installed base" of existing old vaccination forms. While the adoption of a new set of forms and record keeping for new patients is a simple task, it is desired to also provide a solution to labeling and transcription for existing patients, who would have been using a different type of record keeping method. Further more, it is desirable to provide alternatives for practitioners who do not want to or cannot change their existing vaccination form. Therefore, embodiments of the invention provide transcription and labeling features that can be incorporated into existing forms and record keeping methods.

Thus, embodiments of the invention permit practitioners to transition from their existing paper based system to the "full form" disclosure and maintain continuity across the medication preparation, delivery, and record keeping processes. Practitioners could take advantage of either the syringe labeling and transcription features described herein, or both aspects simultaneously. This approach allows practitioners using a mix of old and new style to have a consistent labeling approach for syringes.

Figure 11A:
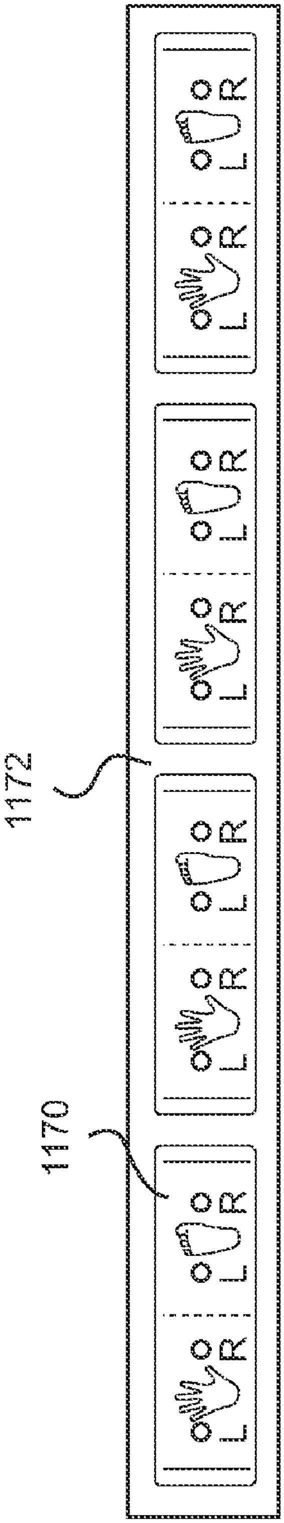
FIG. 11A is a top plan view of a set of labels and backing according to an embodiment of the invention.
Figure 11B:
FIG. 11B is a side view of the label and backing shown in FIG. 11A.

In one embodiment, a label can be provided with the graphic designs described above, but the labels could be provided in a strip arrangement, and the labels would not necessarily include transfer capability. In one embodiment, the practitioner may simply require the syringe or other medication reservoir labeling capability and does not require the transfer capability. This could be, for instance, because the label does not fit dimensionally onto their existing printed vaccination forms. An example of such labels 1170 are shown in FIG. 11, and could be printed using ordinary adhesive label stock suitable for attachment to filled syringes or other medication reservoirs, formed into rolls on a standard paper backing 1172, and subsequently dispensed as are other medical labels. A single label is torn off, filled in, and attached to the syringe. The backing 1172 is discarded.

Figure 12A:
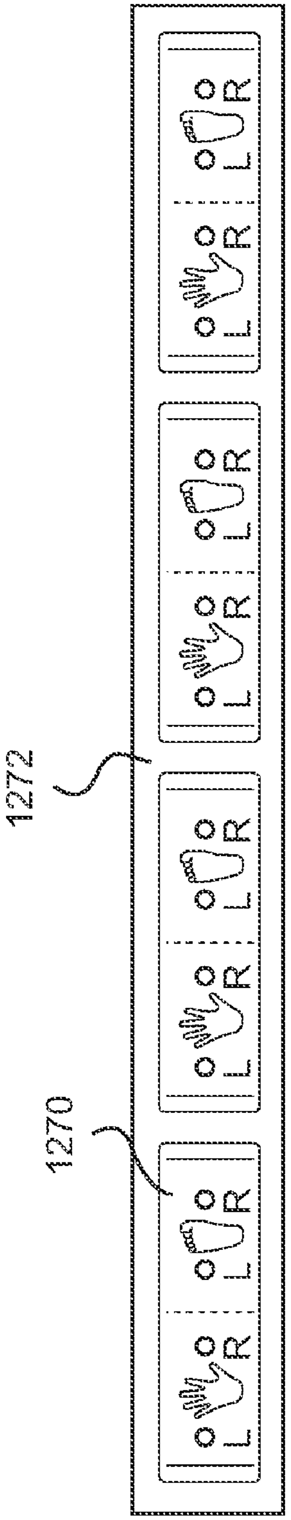
FIG. 12A is a top plan view of a set of labels and backing according to another embodiment.
Figure 12B:
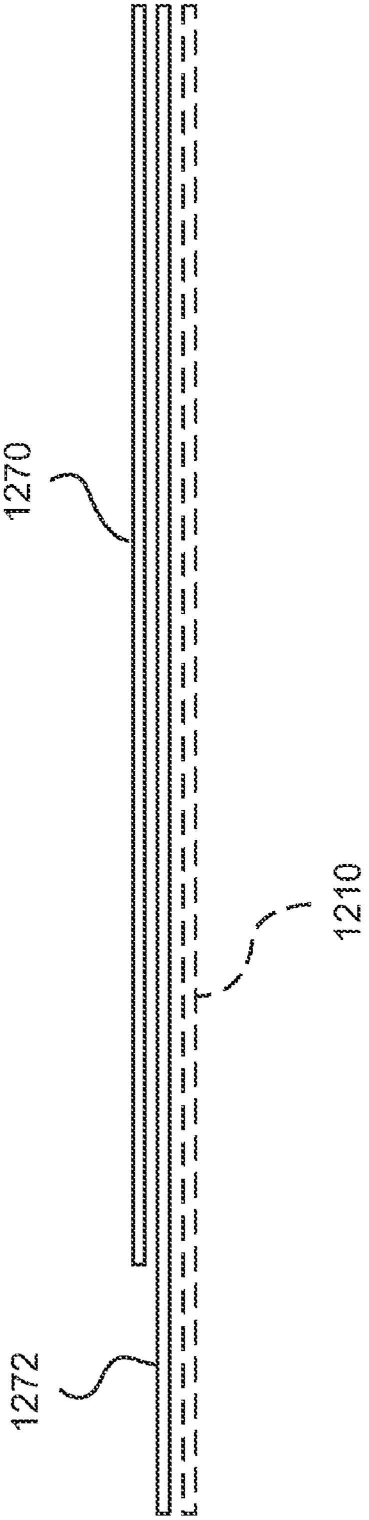
FIG. 12B is a side view of the label and backing shown in FIG. 12A.

In another embodiment shown in FIGS. 12A and 12B, the labels 1270 are provided on a backing 1272 with transfer capability, which are disposed on a substrate 1210. This embodiment is for a practitioner desiring, reservoir labeling and the transfer capability requiring a solution to address existing records. This option provides a speedy transcription capability while allowing the labels 1270 to be attached to the existing old paper based form. This embodiment may be used in conjunction with the full disclosure for new patients. The label may be printed in a similar way to the labels described in previous embodiments, but the label 1270 is reoriented to be in strips rather than stacked vertically. The design still has an interposing transfer layer, allowing transfer of information from the top label layer to the backing without an additional step. However, the backing is itself backed with adhesive, allowing it to be stuck to the existing patient record (which forms the substrate referred to in the disclosure). The label 1270 is removed from the backing and put on the syringe as the disclosure relates; the backing remains on the patient record with an identical copy of the information. Clearly, the label could be narrowed to provide an easier fit on existing vaccination records with rows that are short in height.

Accordingly, while the present invention has been disclosed in connection with various embodiments thereof, it should be understood that other embodiments might fall within the spirit and scope of the invention, as defined by the following claims.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. A kit for tracking medication administration information relating to a medication associated with a medication reservoir, comprising:

a substrate;

a first label on the substrate, the first label having indicia that indicates the anatomical site of administration of the medication in the medication reservoir;

a second label removably adhered to the first label and adapted for adhering to the medication reservoir, the second label comprising the same indicia as on the first label, the second label adapted to transfer information recorded on the second label to the first label.

2. The kit of claim 1, wherein the first and second labels each further comprise an area for recording a content of the medication reservoir.

3. The kit of claim 1, wherein the first and second labels each further comprise pre-printed identification information of a content of the medication reservoir.

4. The kit of claim 1, where the second label is perforated allowing for the removal of the second label.

5. The kit of claim 1, where the indicia comprises a visual representation of the anatomical site of administration selected from hands; feet; arms; legs; torso; a portion of a torso;

a zone of the hands, feet, arm, legs or torso; an outline of a human; human-like representations;

and combinations thereof.

6. The kit of claim 1, further comprising a third removable label on top of the second label, the third label having the same indicia as on the second label, the third label adapted to transfer information recorded on the third label to the second label.

7. The kit of claim 6, wherein the second label is a different size than the first label.

8. The kit of claim 6, wherein the second label contains different information than the first label.

9. The kit of claim 1, wherein the second label comprises a microencapsulated dye or ink to transfer information to the first label.

10. The kit of claim 1, wherein the second label further comprises at least one bar code or radio frequency identification device.

11. The kit of claim 1, further comprising a series of first and second labels in a strip arrangement.

12. The kit of claim 1, wherein the substrate comprises an article selected from the group consisting of a piece of paper, a patient record, a medication vial, a syringe, an ampoule, a magnet and a loop and hook adhesive fabric.

13. The kit of claim 1, wherein the substrate comprises a region containing pre-printed information.

14. The kit of claim 1, wherein the substrate comprises a region of bounded space for recording information.

15. The kit of claim 1, wherein the substrate comprises a region for recording one or more of the medication identification, date given, age, site, route of administration, dose, payer information, manufacturer, lot number, expiration date, reaction/prior reaction, signature/initial of the administrator, parent/guardian signature/initials.

16. A kit for tracking administration of a medication from a medication reservoir to a patient, comprising:

a substrate; and a first label located on the substrate a second label removably attached on top of the first label;

the first label and the second label comprising an area for recording the identification of the medication reservoir contents which is optionally pre-printed, indicia for identifying an anatomical site of injection to the patient, optionally, at least one blank area for recording customized information, optionally at least one bounded space for recording specific information, and optionally space for additional labels, space for recording one or more of the lot number of the medication reservoir contents, date, identification of medical personnel and relevant notes; and a substance between the first label and the second label that transfers information written on the from the second label to the first label.

17. A kit for tracking medication administration to a patient, comprising:

a substrate; and a label, the label being located on the substrate, the label further comprising at least a top layer and a subsequent layer, an area for recording the identification of the medication reservoir contents which is optionally pre-printed, indicia for identifying the location of the administration, the top layer of the label being adapted for adhering to a medication reservoir, and the label including a substance for transferring information written on the top layer to the subsequent layer, the substrate comprising pre-printed information relating to the administration of medication, and optionally at least one blank area for recording customized information, and optionally at least one bounded space for recording specific information, and optionally space for additional labels, space for recording one or more of the lot number of the medication reservoir contents, date, identification of medical personnel and relevant notes.

18. The kit of claim 17, wherein the subsequent layer comprises the substrate.

19. The kit of claim 17, wherein the label is perforated allowing for the removal of a part of the label.

20. The kit of claim 17, where the indicia comprises a visual representation of the anatomical site of delivery selected from the group consisting of hands; feet; arms; legs; torso; a portion of a torso; a zone of the hands, feet, arm, legs or torso; an outline of a human; human-like representations and combinations thereof.

21. A method for monitoring administration of medication to a patient using a substrate and a medication reservoir comprising:

providing the medication reservoir containing a medication for administration to the patient;

recording an anatomical site of administration of the medication to the patient on a label, the label being located on a substrate, the recording causing a transfer of the recording from the label to the substrate;

removing the label from the substrate;

affixing the label to the medication reservoir; and administering the contents of the medication reservoir to the patient.

22. A medical monitoring kit comprising:

a plurality of syringes adapted for administering medication to a patient;

a plurality of forms adapted for recording patient history; and a plurality of labels adapted for adhering to one of the syringes, each of the labels having a first layer on top of a second layer, the first layer and the second layer comprising indicia for recording an anatomical site of administration of medication to the patient, there being a substance between each one of the first layers and its associated second layer that transfers information recorded on the first layer to the second layer.

23. A method of transcribing information comprising:

recording information pertaining to a medication on a label adapted for adhering to a surface, the label comprising a top surface, at least one layer below the top surface, a substance adapted to transfer information recorded on the top surface to the at least one layer and indicia for recording an anatomical site of administration of the medication to a patient;

removing the top surface of said label; and applying the top surface of the label to a first surface.

* * * * *